(12) United States Patent
Fogwill et al.

(10) Patent No.: US 12,320,787 B2
(45) Date of Patent: Jun. 3, 2025

(54) INSULATED SERIAL COLUMN CHROMATOGRAPHY ARRANGEMENTS AND SYSTEMS

(71) Applicant: Waters Technologies Corporation, Milford, MA (US)

(72) Inventors: Michael O. Fogwill, Uxbridge, MA (US); Martin Gilar, Franklin, MA (US); Joseph D. Michienzi, Plainville, MA (US); Wade P. Leveille, Douglas, MA (US); Geoff C. Gerhardt, Woonsocket, RI (US); Jeffrey Musacchio, Sharon, MA (US); Jason F. Hill, Milford, MA (US); Sylvain G. Cormier, Mendon, MA (US)

(73) Assignee: Waters Technologies Corporation, Milford, MA (US)

( * ) Notice: Subject to any disclaimer, the term of this patent is extended or adjusted under 35 U.S.C. 154(b) by 97 days.

(21) Appl. No.: 17/354,296

(22) Filed: Jun. 22, 2021

(65) Prior Publication Data

US 2021/0396722 A1     Dec. 23, 2021

Related U.S. Application Data

(60) Provisional application No. 63/042,378, filed on Jun. 22, 2020.

(51) Int. Cl.
| | |
|---|---|
| *G01N 30/46* | (2006.01) |
| *G01N 30/30* | (2006.01) |
| *G01N 30/32* | (2006.01) |
| *G01N 30/02* | (2006.01) |

(52) U.S. Cl.
CPC .......... *G01N 30/463* (2013.01); *G01N 30/30* (2013.01); *G01N 30/32* (2013.01); *G01N 2030/025* (2013.01); *G01N 2030/027* (2013.01); *G01N 2030/3038* (2013.01);
(Continued)

(58) Field of Classification Search
CPC ...... G01N 30/30; G01N 30/32; G01N 30/463; G01N 2030/326; G01N 2030/328; G01N 2030/3038; G01N 2030/3046
See application file for complete search history.

(56) References Cited

U.S. PATENT DOCUMENTS

| | | | | |
|---|---|---|---|---|
| 3,668,935 A | * | 6/1972 | Coelho | ................. G01N 30/20 |
| | | | | 73/864.85 |
| 5,744,696 A | * | 4/1998 | Wang | ..................... C01B 3/505 |
| | | | | 374/33 |

(Continued)

FOREIGN PATENT DOCUMENTS

| | | | |
|---|---|---|---|
| CN | 102302887 B | * | 8/2013 |
| JP | H10282079 A | * | 10/1998 |

*Primary Examiner* — John Fitzgerald
(74) *Attorney, Agent, or Firm* — Goodwin Procter LLP

(57) ABSTRACT

Exemplary embodiments eliminate the need for column ovens in serial column chromatography arrangements and systems by using insulated sleeves. The insulated sleeves may encase individual chromatography columns or clusters of chromatography columns. The use of the insulated sleeves allows the chromatography columns to be positioned in close proximity to each other. This may decrease the overall size of a serial column chromatography arrangement and may reduce costs by not requiring the column ovens.

13 Claims, 11 Drawing Sheets

(52) U.S. Cl.
CPC ............ *G01N 2030/3046* (2013.01); *G01N 2030/326* (2013.01); *G01N 2030/328* (2013.01)

(56) References Cited

U.S. PATENT DOCUMENTS

| | | | | |
|---|---|---|---|---|
| 6,217,829 | B1* | 4/2001 | Mustacich | G01N 30/30 |
| | | | | 422/89 |
| 6,632,268 | B2* | 10/2003 | Seeley | G01N 30/463 |
| | | | | 73/23.39 |
| 6,641,783 | B1* | 11/2003 | Pidgeon | G01N 30/7266 |
| | | | | 210/659 |
| 6,682,699 | B2* | 1/2004 | Mustacich | G01N 30/30 |
| | | | | 422/89 |
| 6,719,001 | B2* | 4/2004 | Ahlgren | F16K 11/0743 |
| | | | | 137/625.15 |
| 6,932,939 | B2* | 8/2005 | Ozbal | G01N 35/1095 |
| | | | | 422/63 |
| 7,281,408 | B2* | 10/2007 | Srinivasan | B01J 19/0046 |
| | | | | 422/89 |
| 7,517,698 | B2* | 4/2009 | Dussauze | G01N 1/405 |
| | | | | 436/178 |
| 10,413,846 | B2* | 9/2019 | Bouvier | G01N 30/54 |
| 11,016,066 | B2* | 5/2021 | Nijsen | G01N 33/497 |
| 11,567,044 | B2* | 1/2023 | Matsuoka | G01N 30/46 |
| 2002/0014106 | A1* | 2/2002 | Srinivasan | B01J 19/0046 |
| | | | | 73/23.42 |
| 2004/0038384 | A1* | 2/2004 | Dussauze | G01N 35/1097 |
| | | | | 435/287.1 |
| 2007/0204749 | A1* | 9/2007 | Adkins | G01N 30/6034 |
| | | | | 96/101 |
| 2008/0053543 | A1* | 3/2008 | Baier | G01N 30/20 |
| | | | | 137/625.25 |
| 2015/0369781 | A1* | 12/2015 | Zheng | G01N 30/32 |
| | | | | 422/503 |
| 2017/0282096 | A1* | 10/2017 | Bouvier | B01D 15/20 |
| 2018/0149289 | A1* | 5/2018 | Geovanos | F16K 99/0005 |
| 2020/0182837 | A1* | 6/2020 | Iwata | G01N 30/466 |
| 2021/0396721 | A1* | 12/2021 | Fogwill | G01N 30/46 |

\* cited by examiner

INSULATED SERIAL COLUMN CHROMATOGRAPHY ARRANGEMENTS AND SYSTEMS

CROSS-REFERENCE TO RELATED APPLICATIONS

This application claims the benefit of and priority to U.S. Provisional Patent Application No. 63/042,378, filed on Jun. 22, 2020, the entire contents of which is hereby incorporated by reference.

BACKGROUND

In single column arrangements for chromatography, a mobile phase passes through a chromatography column on to a detector. With multiple columns arrangements, the mobile phase may flow through multiple chromatography columns. In parallel arrangements, the mobile phase flows through multiple columns concurrently or mobile phases having different samples of analyte flow the through multiple chromatography columns concurrently. In serial arrangements, mobile phase with a sample of analyte flows through successive columns in a sequence and eventually onto a detector. One form of serial chromatography is multidimensional chromatography, wherein a mobile phase flows through a first chromatography column onto a detector and a portion which has already flowed through the first chromatography column flows through a second chromatography column onto another detector.

SUMMARY

In accordance with an exemplary embodiment, a chromatography columns arrangement, includes a plurality of chromatography columns arranged in a longitudinally parallel configuration and insulated by insulating sleeves. The arrangement includes an inlet valve for directing mobile phase with a sample of analyte into the configuration and an outlet valve for directing the mobile phase with the sample of analyte from a selected one of the chromatography columns to an output. The arrangement also includes a controller for controlling the inlet valve and the outlet valve to serially pass the mobile phase with the sample of analyte through multiple successive ones of the plurality of chromatography columns.

The insulation may include a single insulating sleeve which collectively encases the chromatography columns in the configuration. The insulation may include a plurality of insulating sleeves such that each of the chromatography columns in the arrangement is insulated by a separate insulating sleeve of the plurality of insulating sleeves. The arrangement may have an inlet mobile phase heater for each of the chromatography columns in the configuration or an outlet heater for each of the chromatography columns in the configuration.

The controller may be configurable to select a desired number of chromatography columns for the mobile phase with the sample of analyte to serially pass though. The desired number of chromatography columns may be, for example, 1, 2, 3, 4 or 5. More generally, the number of chromatography columns may be any number where an implementation is feasible. The maximum number of chromatography columns may be limited by total pressure drop and the pressure ceiling of the instrument. The inlet selection valve may have an inlet port connected to an inlet tube for receiving the mobile phase with the sample of analyte and respective ports in fluid communication with a respective one of the chromatography columns. The outlet selection valve may have an outlet port connected to an outlet tube directing the mobile phase/sample downstream toward detection. A single inlet mobile phase heater may be provided for the arrangement. The arrangement may include fluidic connections from the outlet selection valve to inlets of at least some of the chromatography columns. A first of the chromatography columns in the plurality of chromatography columns may be oriented to have an inlet fluidically coupled to the inlet selection valve, and an outlet fluidically coupled to the outlet selection valve and a second of the chromatography columns in the plurality of chromatography columns may be oriented to have an inlet fluidically coupled to the outlet selection valve and an outlet fluidically coupled to an inlet selection valve. The plurality of chromatography columns may be liquid chromatography columns. The one or more insulating sleeves may include a vacuum sleeve, a sleeve of insulating material or a sleeve containing gas. The analyte storage may be a trap column or a fluidic storage loop.

In accordance with an exemplary embodiment, a multidimensional chromatography system includes a first insulated chromatography column having an inlet and an outlet and a second insulated chromatography column having an inlet and an outlet. The system also includes a first fluidic line fluidically coupled to the outlet of the first insulated chromatography column and a second fluidic line fluidically coupled to the outlet of the second insulated chromatography column. The system includes an analyte storage for storing analyte. The system further includes an inlet valve for receiving the mobile phase and passing the mobile phase into the inlet of the first insulated chromatography column. The system has an outlet valve having a first position for: directing output form the first insulated chromatography column to the analyte storage and a second position for directing flow from the analyte storage to the second insulated chromatography column.

The system may include mobile phase heaters/coolers for the first insulated chromatography column and the second insulated chromatography column. The system may also include a pump for pumping the mobile phase out of the second fluidic line. The system may include column outlet heaters/coolers. The system may have an inlet fluidics cap having fluidics connections for the multidimensional chromatography system and a modulation cap to which the analyte storage is affixed or integrated. The multidimensional chromatography system may be a liquid chromatography system or a gas chromatography system. The system may include a modulation cap which contains the outlet valve. The analyte storage device may be a trap column or a fluidic storage loop. The first insulated chromatography column and the second insulated chromatography column may each be insulated by a vacuum sleeve, a sleeve of insulating material or a sleeve of gas.

DETAILED DESCRIPTION

One challenge with conventional serial column chromatography systems is their use of column ovens. The column ovens help to prevent thermal gradients from forming in the chromatography columns. Unfortunately, the column ovens are large and thus occupy a great deal of space, especially when each chromatography column requires its own column oven.

Exemplary embodiments eliminate the need for column ovens in serial column chromatography arrangements and systems by using insulating sleeves. The insulating sleeves may encase individual chromatography columns or clusters of chromatography columns. The use of the lower radial thickness insulating sleeves with sufficient insulating capability allows the chromatography columns to be positioned in close proximity to each other relative to conventional arrangements. This may decrease the overall size of a serial column chromatography arrangement or system and may reduce costs by not requiring the column ovens.

The chromatography columns of the exemplary embodiments may be liquid chromatography columns or supercritical fluid columns. The columns may be packed columns, open tubular columns, or packed capillary columns. Thermal radial gradients may be especially of interest to packed columns approximately 1 mm in internal diameter and above. The chromatography columns may be gas chromatography columns, but thermal gradients typically are less of an issue for gas chromatography columns.

Figure 1A:
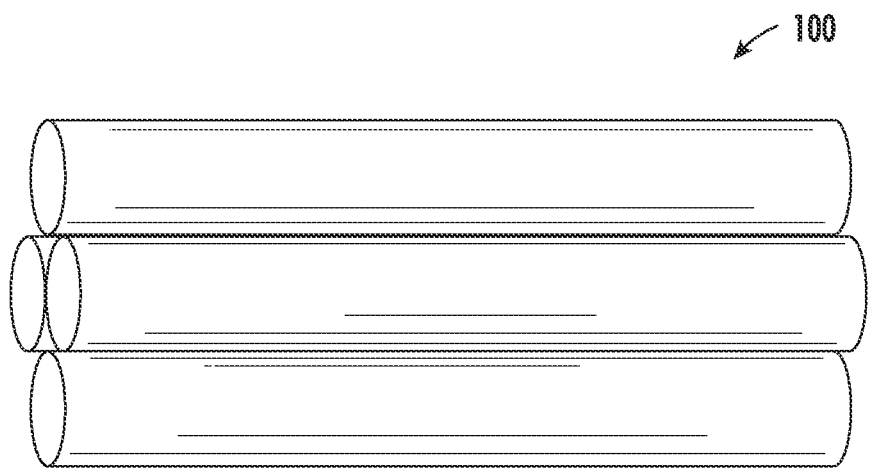
FIG. 1A depicts an illustrative cluster of chromatography columns for use in an exemplary embodiment.
Figure 1B:
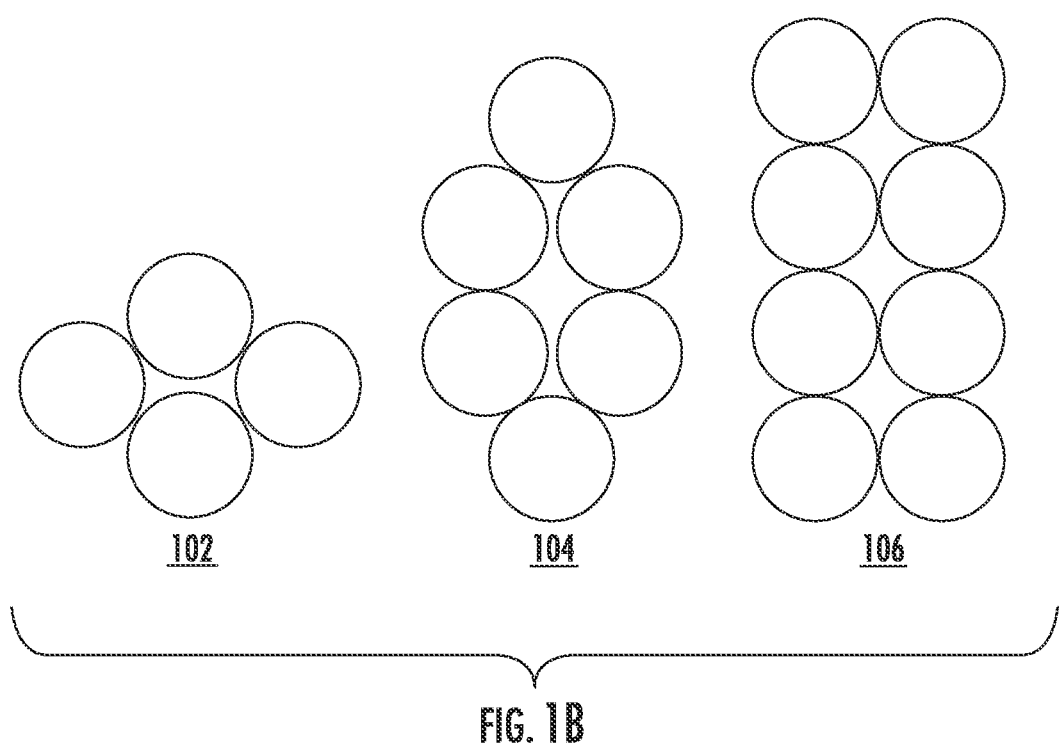
FIG. 1B depicts illustrative clusters of four chromatography columns, six chromatography columns and eight chromatography columns.
Figure 1C:
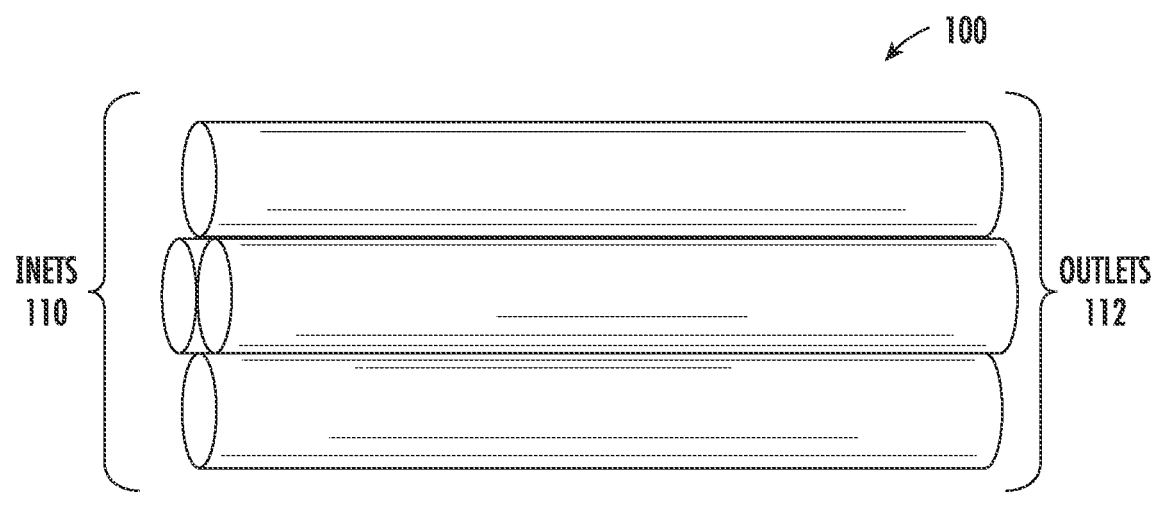
FIG. 1C depicts an illustrative cluster of chromatography columns where all of the inlets are on a same end and all of the outlets are on a same end.

The absence of the column ovens allows the chromatography columns to be arranged in close proximity, such as a longitudinally parallel cluster 100, as shown if FIG. 1A. This cluster configuration is possible because of the use of insulative technology, such as vacuum jacket sleeves. This cluster 100 of 4 columns is illustrative and other numbers of chromatography columns may be used and in different configurations. As shown in FIG. 1B, there is an end view 102 of the cluster of four chromatography columns shown in FIG. 1A. FIG. 1B also shows an end view 104 of a cluster of six longitudinally parallel chromatography columns and an end view 106 of a cluster of eight longitudinally parallel chromatography columns. These illustrative arrangements are intended to be exemplary and not limiting. Those skilled in the art will appreciate that other arrangements not shown may be used in alternative embodiments.

Figure 1D:
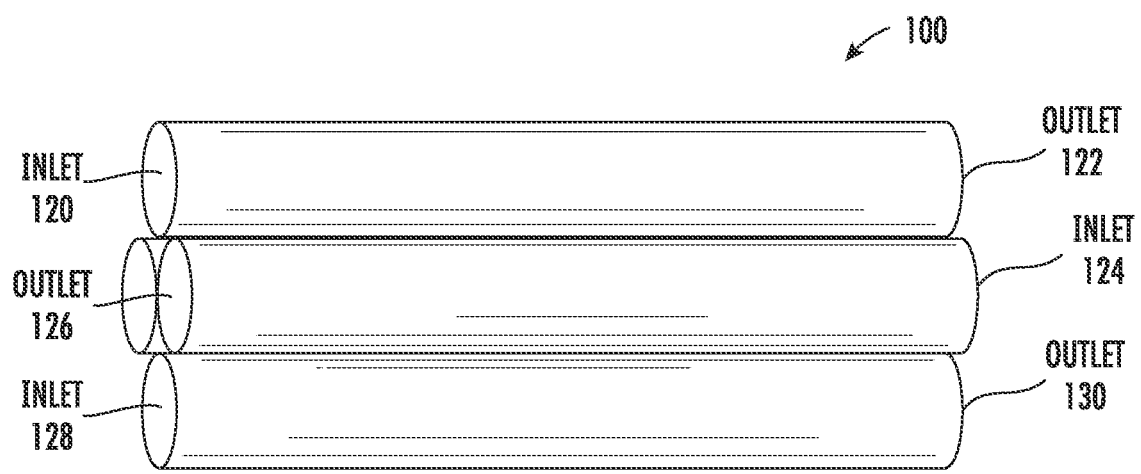
FIG. 1D depicts an illustrative cluster of chromatography columns where inlets and outlets of chromatography columns are on alternating ends.

As will discussed below, in exemplary embodiments, the chromatography columns may have all of their inlets 110 arranged in a single direction with all of their outlets 112 arranged in the opposite direction in a given chromatography column cluster 100. Alternatively, the orientation of the inlets 120, 124 and 128 in the cluster 100 may vary (such as alternating among adjacent chromatography columns) as shown in FIG. 1D. Similarly, the orientation of the outlets 122, 126 and 130 may vary as shown in FIG. 1D.

Figure 2:
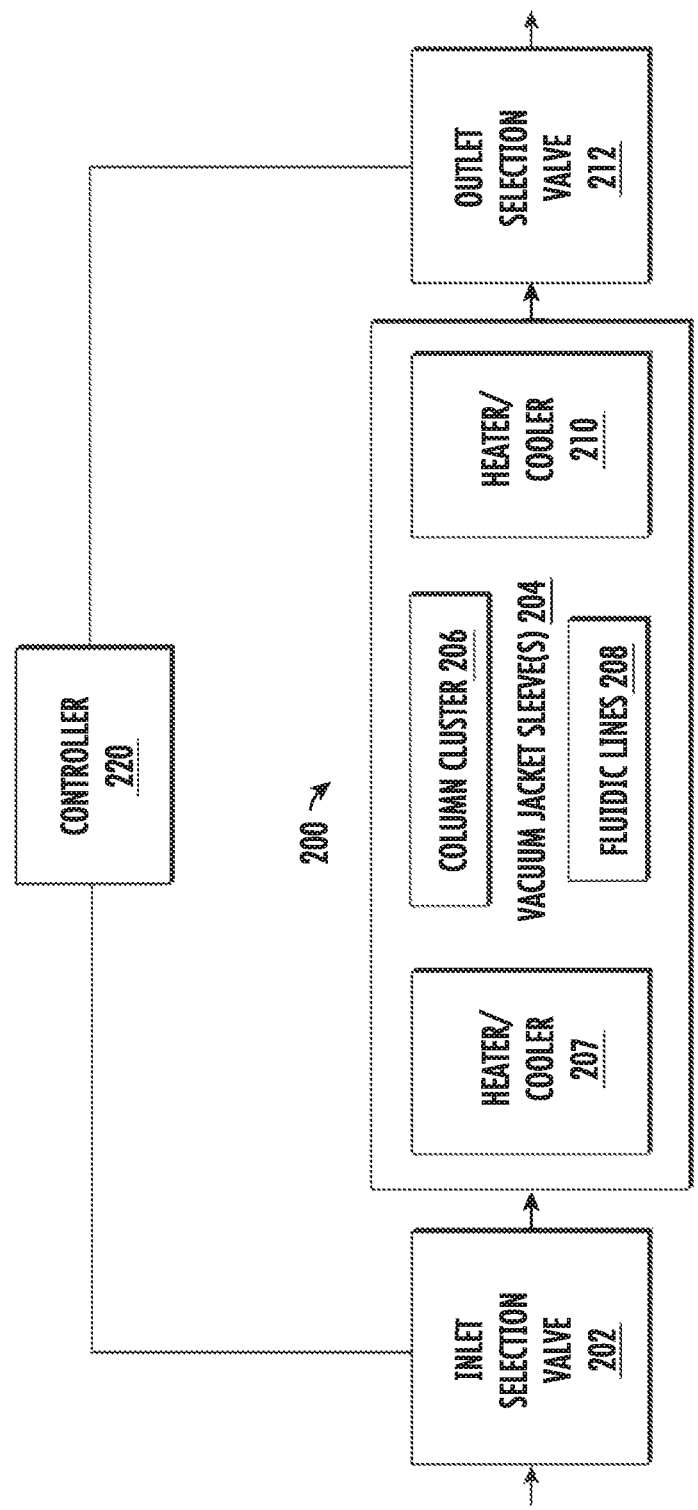
FIG. 2 depicts a block diagram of a serial column chromatography system of an exemplary embodiment.

FIG. 2 depicts a block diagram of a serial chromatography column arrangement 200 for an exemplary embodiment. The serial chromatography column arrangement 200 includes an inlet selection valve 202 for selecting what chromatography column in a column cluster 206 receives the input mobile phase with a sample of analyte. The inlet selection valve 202 may also play a role in directing the flow of the mobile phase through one or more additional chromatography columns in the column cluster 206 in a serial fashion. An inlet heater/cooler 207 may be provided for heating or cooling the mobile phase at a proximal end of the column cluster 206. Fluidic lines 208 may be provided to connect the chromatography columns in the column cluster with the inlet selection valve 202 and an outlet selection valve. The arrangement may require, for instance for fluidic lines 208 to run from the outlet selection valve 212 to inlets of chromatography columns in the column cluster 206 or between ports of the inlet selection valve 202 and the outlet selection valve 212. The outlet selection valve 212 may play a role in directing output from a given chromatography column in the column cluster 206 to another chromatography column in the column cluster 206. An outlet heater/cooler 210 may be provided for imparting heat or cool to the distal end of the column cluster 206.

The heaters/coolers 207 and 210, the column cluster 206 and the fluidic lines may be encased in a single insulating sleeve, or the chromatography columns in the column cluster may be individually encased in insulating sleeves to provide insulation. The insulating sleeves may be vacuum sleeves or may be sleeves of insulating material. Where the insulating sleeve is a vacuum sleeve, the vacuum area may be evacuated and in some cases, may then be filled with a gas of lower thermal conductivity than air, such as at least one of: helium, hydrogen, neon, nitrogen, oxygen, carbon dioxide, argon, sulfur hexafluoride, krypton, and xenon. The vacuum sleeve may be a tube having walls made of steel or titanium, and the vacuum area may be formed in an area between sealed walls of the tube. The insulating sleeve, instead of being a vacuum sleeve, may be made from an insulating material like polystyrene foam (Styrofoam®), or more generally, any material exhibiting low thermal conductivity to act as an insulating member. Polymers such as polymethacrylate, silicone, urethane, polyolefins, polyamide, polysulfone, polyethyramide, polycarbonate, rubber, polyester, polyfluoroelastomers and polyethylene terephthalate, and the like, also may be used to form the insulating sleeve. Additionally, ceramics, such as aerogels, fibrous materials, such as methylcellulose, fiberglass and the like, may be used to form the insulating sleeve.

A controller 220 controls the inlet selection valve 202 and output selection valve as will be detailed below. The controller 220 may be, for example, a programmed microprocessor, electrical circuitry, a field programmable gate array (FPGA), an application specific integrated circuit (ASIC), a microcontroller, electrical circuitry or combinations thereof.

Figure 3:
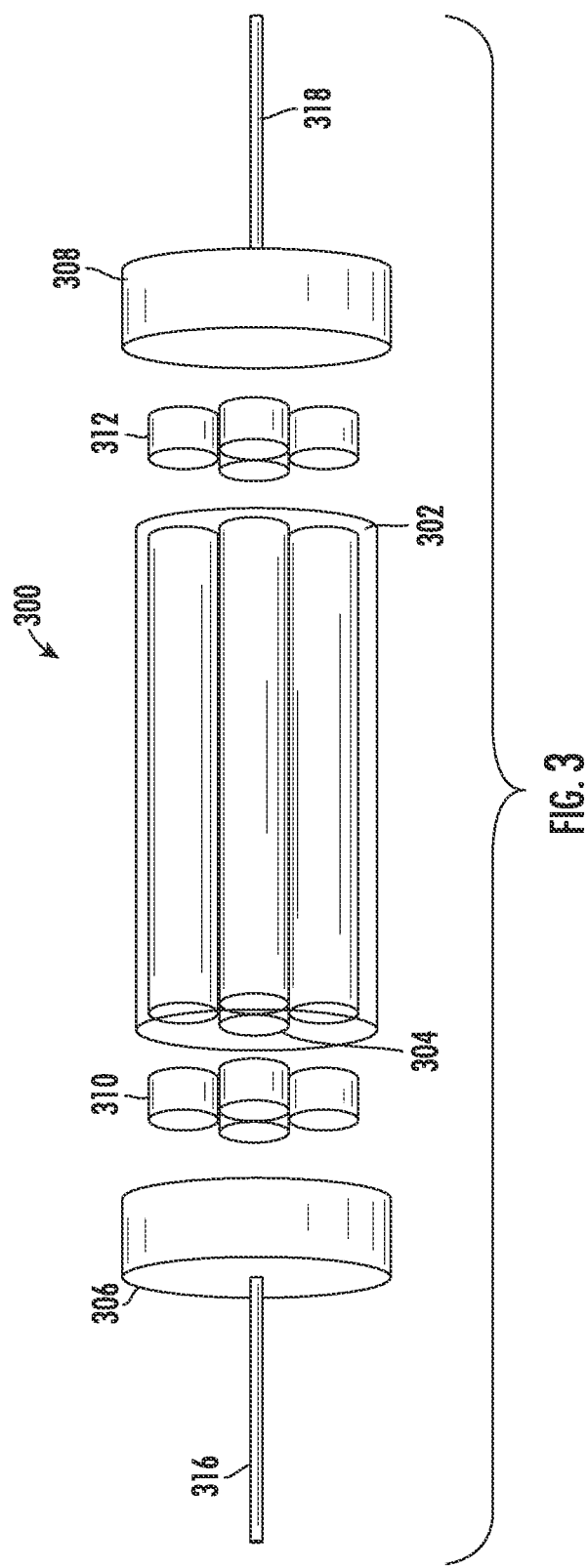
FIG. 3 depicts a serial column chromatography system where a single insulating sleeve encases the column cluster.

FIG. 3 depicts a first exemplary embodiment 300 in which four chromatography columns are used in parallel. There are four chromatography columns 304 arranged as previously shown surrounded by an insulating sleeve 302. The insulating sleeve 302 may be formed of metal or other suitable material. Heaters/coolers 310 and 312 are provided for each chromatography column 304. The inlet heaters/coolers heat or cool the mobile phase at an inlet end of the chromatography columns, and the heaters/coolers may heat/cool the distal end of the chromatography columns, respectively. Inlet selection valve 306 and outlet selection valve 308 serve as end caps and form a sealed container. The area between the insulating sleeve 302 and the chromatography columns 304 may be evacuated to form an insulative vacuum in some cases. The inlet selection valve 306 controls the flow of the mobile phase from input tube 316 to the chromatography columns 304. The valve has an interface (such as a port) with the inlet tube 316. The mobile phase may pass to the chromatography columns 304 in serial fashion as will be described below. The output selection valve 308 controls the flow of output eluting from the chromatography columns 304 to an output tube 318. The output selection valve includes an interface (such as a port) with the output tube 318.

Figure 4:
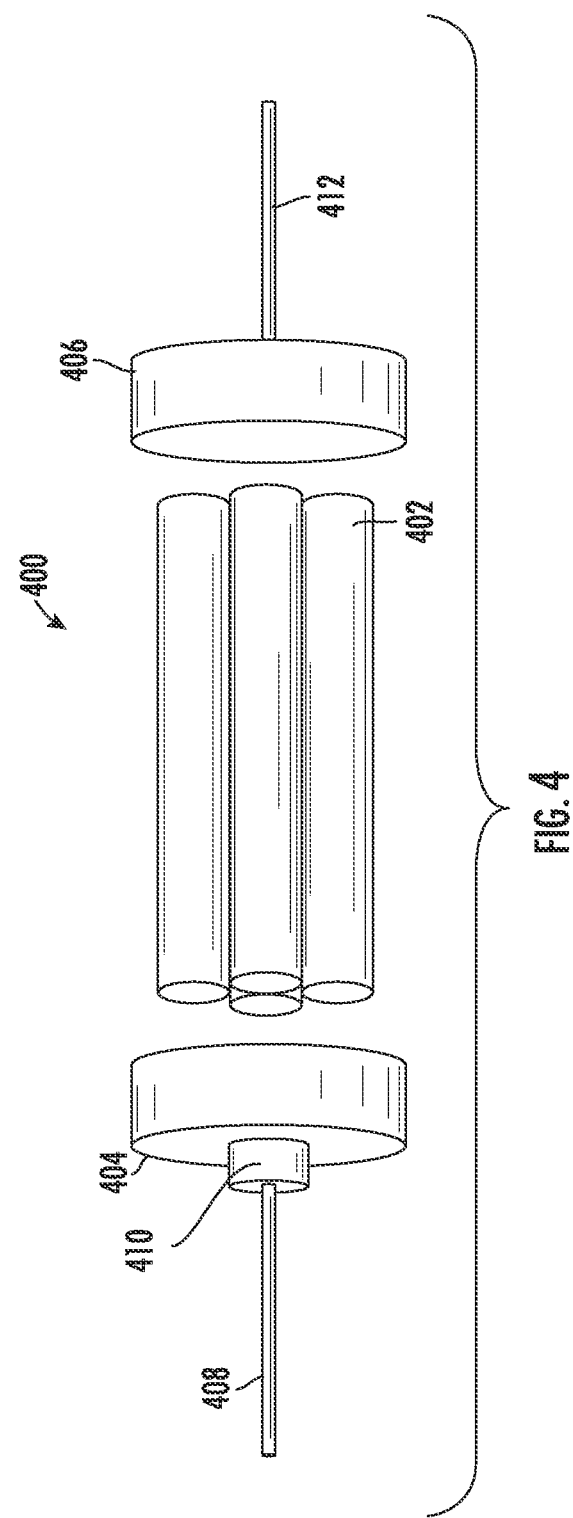
FIG. 4 depicts a serial column chromatography system where each column has an individual insulating sleeve.

FIG. 4 depicts an alternative embodiment 400 in which the chromatography columns are used in a serial fashion, but the inlet selection valve 404 initially delivers the mobile phase to a first of the chromatography columns 402. In this embodiment 400, there is not a single insulating sleeve that surrounds all of the chromatography columns 402; rather each of the chromatography columns 402 has its own insulating sleeve. The chromatography columns 402 interface with the inlet selection valve 404 and the outlet selection valve 406, which serve as end caps for the chromatography column arrangement. A single heater/cooler 410 for heating or cooling the is provided. The mobile phase with the analyte is received from an inlet tube 408 and heated or cooled by the heater/cooler 410. The inlet selection valve 404 has an interface with the inlet tube 408. The outlet selection valve 406 has an interface with an outlet tube 412 that leads the output to a detector, such as found in an MS system.

Figure 5A:
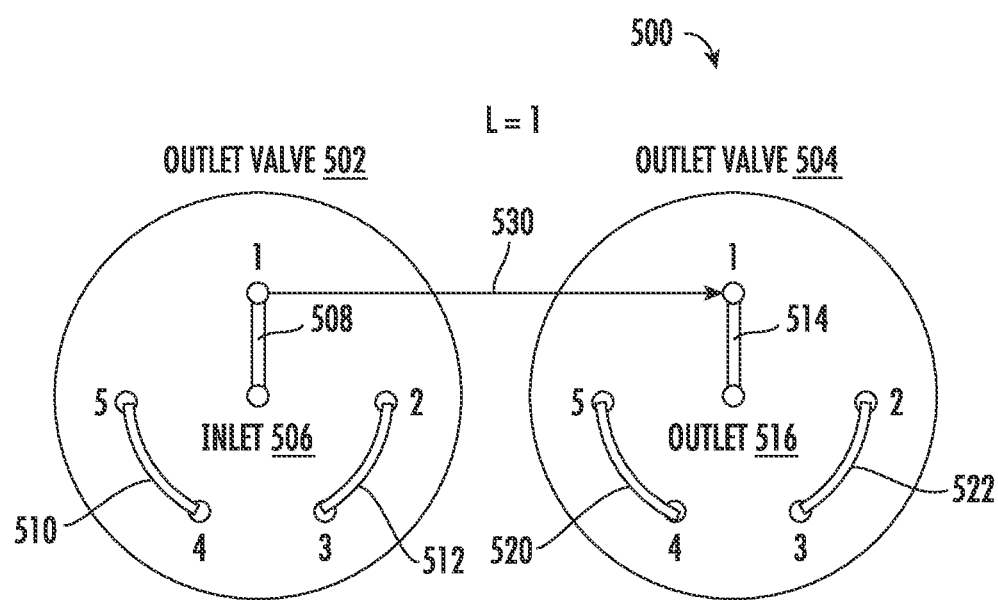
FIG. 5A depicts an illustrative valve configuration to direct mobile phase through a single chromatography column.

The exemplary embodiments of FIGS. 3 and 4 enable the mobile phase to be delivered to one or more columns in serial fashion. The controller is configurable to control the inlet selection valve and the outlet selection valve to cause the mobile phase to flow through the one or more chromatography columns in a desired sequence. FIG. 5A depicts an illustrative inlet selection valve 502 and outlet selection valve 504 in a configuration that directs the mobile phase through a single chromatography column. The inlet selection valve 502 and the outlet selection valve 504 may be flat disk valves having a rotor and stator. In some alternative embodiments, a single valve may be used to act as inlet selection valve and outlet selection valve. Different valve positions may be achieved under the direction of the controller 220 (FIG. 2) by rotating the rotors relative to the stators via a step motor or other suitable mechanism. The valves 502 and 504 may be made of metal, such as stainless steel.

The inlet selection valve 502 of FIG. 5A has 5 peripherally situated ports numbered 1 through 5. Each of these ports may be connected to the inlet of a respective chromatography column in the column cluster 206. The inlet selection valve 502 also has a centrally positioned inlet port 506 for receiving the mobile phase with the sample of analyte via the inlet tube. In FIG. 5A, a trace 508 creates a channel from the inlet port 506 to port 1. Thus, the mobile phase enters the inlet selection valve 502, flows through the trace 508 to port 1 on to the inlet of the chromatography column ("column 1") coupled to port 1. The outlet selection valve 504 has a similar configuration as the inlet selection valve except for the peripherally situated ports being coupled to the outlet of the chromatography columns. Port 1 of the outlet selection valve 504 receives the output from the outlet of column 1 (see arrow 530). The output flow through trace 514 and passes out to an outlet tube via port 516 that acts as an outlet port. The traces 510 and 512 on the inlet selection valve 502 and traces 520 and 522 do not play a significant role in this instance.

Figure 5B:
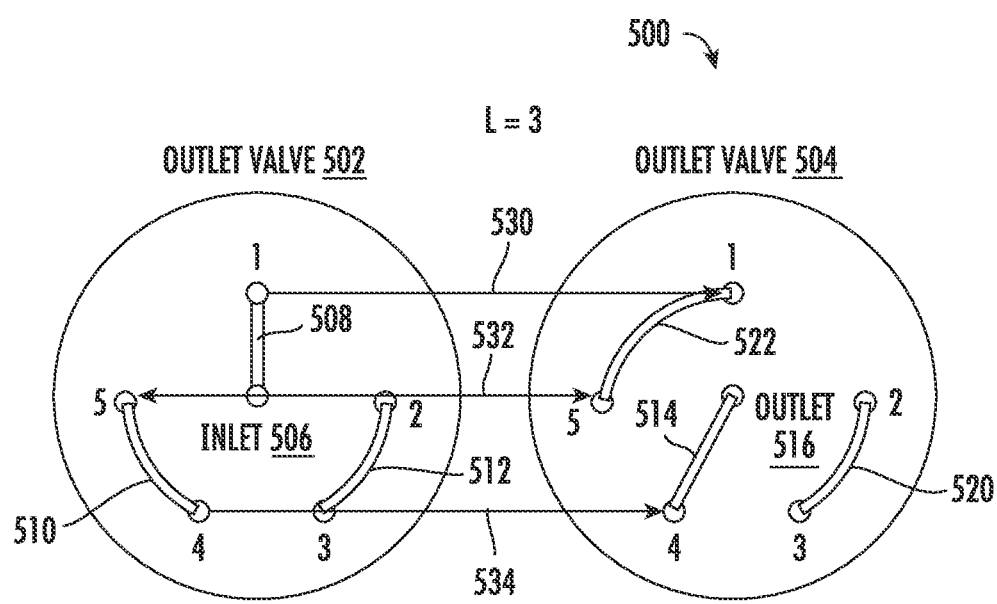
FIG. 5B depicts an illustrative valve configuration to direct mobile phase through three chromatography columns.

FIG. 5B depicts outlet selection valve 504 in a different position than FIG. 5A and the inlet selection valve in a same position that causes the mobile phase to flow through three columns in a serial fashion. The mobile phase still enters via inlet port 506 of the inlet selection valve 502 and passes through trace 508 to port 1 leading to column 1. The mobile phase passes through column 1 (see arrow 530) and enters the outlet selection valve 504 at port 1. Instead of flowing to the outlet port 516, the mobile phase flows through trace 522 to port 5, which is in fluid communication (such as via fluidic lines 208) with the inlet of column 5. The mobile phase then flows through column 5 (see arrow 532) and is output to port 5 of the inlet selection valve 502. The mobile phase flows through trace 510 and enters column 4. The mobile phase flows through column 4 (see arrow 534) and is output to port 5 of the outlet selection valve 504. The mobile phase then flows through trace 514 on to the outlet port 516 that outputs the mobile phase to a detector.

Figure 5C:
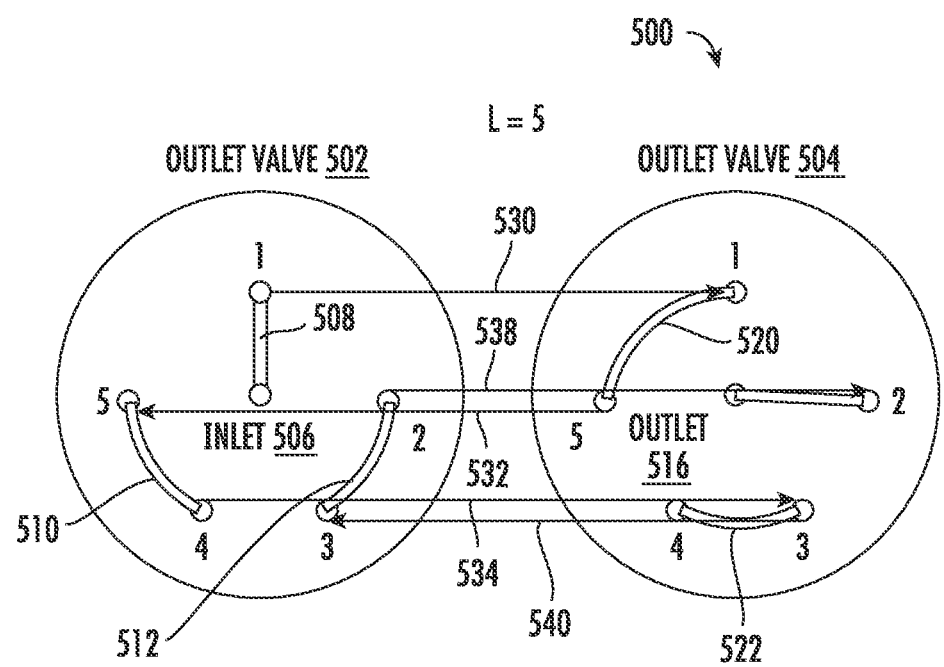
FIG. 5C depicts an illustrative valve configuration to direct mobile phase through five chromatography columns.

FIG. 5C depicts outlet selection valve 504 in another position with the inlet selection valve in a same position that causes the mobile phase to flow through five columns in a serial fashion. The flow through the first three columns is the same as described above relative to FIG. 5B. However, when the mobile phase reaches port 4 of the outlet selection valve, the flow is no longer to the outlet port 516. Instead, the flow is directed down trace 522 to port 3, which is in fluidic communication with the inlet of column 3. The mobile phase flows through column (see arrow 540), where the mobile phase flows through trace 512 to port 2 of the inlet selection valve. Port 2 leads to the inlet of column 2. The mobile phase flows through column 2 (see arrow 538) to port 2 of the outlet selection valve 504. The mobile phase then flows through trace 516 of the outlet selection valve 504 to the outlet port 516 and on to the detector.

It should be appreciated the valve configuration of FIGS. 5A, 5B and 5C is merely illustrative and that other valves and valve configurations may be used, such as a single valve arrangement as mentioned above. It should be appreciated that more than one valve may be used in place or the singular inlet selection valve 502 or in place of the singular outlet selection valve 504. Moreover, the inlet selection valve 502 and the outlet selection valve 504 need not be flat disk valves. Still further, the input selection valve 502 and the outlet selection valve 504 need not be integrated into the end cap but may be separate and may be coupled to the respective end cap structures.

Figure 6:
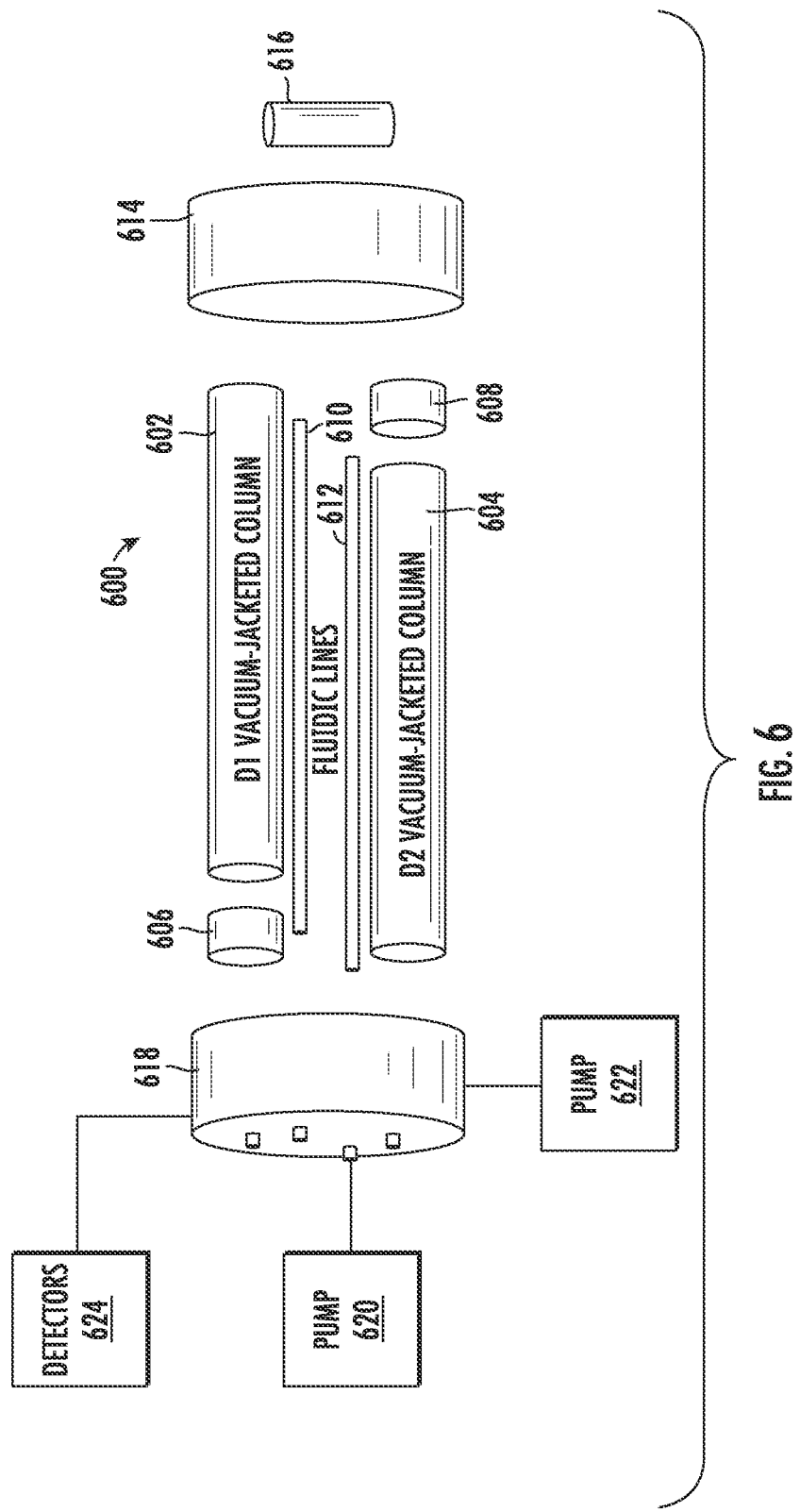
FIG. 6 depicts an illustrative multidimensional serial column system of an exemplary embodiment.

The serial column arrangements need not be solely one where the flow passes in total from one column to the next in a serial sequence. The exemplary embodiments may also include embodiments for multidimensional chromatography. FIG. 6 shows an exemplary embodiment 600 for multidimensional chromatography. The multidimensional chromatography system 600 includes a first insulated chromatography column 602 and a second insulated chromatography column 604. A heater/cooler 606 and a heater/cooler 608 is provided for each chromatography column 602 and 604 for heating or cooling the mobile phase. The multidimensional chromatography system 600 includes a first fluidic line 610 and a second fluidic line 612 for carrying fluids. Fluids may enter and leave via an inlet fluidics cap 618. A pump 620 may be provided for pumping mobile phase to the inlet fluidics cap. Secondary pump 622 may be provided for pumping fluid out of the chromatography column 604 to a detector. A modulation cap 614 is provided for helping to direct flow into an analyte storage 616, such as a trap or fluidic loop, and then on to chromatography column 604 as described below.

During operation of the multidimensional chromatography system 600, mobile phase with a sample of analyte is pumped by pump 620 to the inlet fluidics cap 618 into chromatography column 602. The sample of analyte is separated by the chromatography column 602. The outlet of the chromatography column 602 is directed to waste or to the detector 624 via fluidic line 610. The pump 622 directs flow of a mobile phase through the second chromatography column 604 and then to the detector 624. When a portion of the separation from chromatography column 602 is to be subject to additional separation, the modulation cap 614 directs the output from chromatography column 602 to the analyte storage 616. The modulation cap 614 then directs flow from the pump 622 through the analyte storage 616 on to the second chromatography column 604, where the contents from the analyte storage are further separated. The output from chromatography column 604 may be passed to the detector 624.

While exemplary embodiments have been described herein, various changes in form and detail may be made without departing from the intended scope as defined in the appended claims.

The invention claimed is:

1. A chromatography columns arrangement, comprising:
   a plurality of chromatography columns arranged in a longitudinally parallel cluster configuration;
   a single insulating sleeve which collectively encompasses the chromatography columns in the cluster configuration and provides thermal management of the chromatography columns;
   first and second end caps for the chromatography columns arrangements, the endcaps being sized to encompass the plurality of chromatography columns and to interface with the single insulating sleeve to form a sealed container;
   an inlet valve for directing mobile phase with a sample of analyte into the cluster configuration, the inlet valve interfaces with the insulating sleeve and integrated into the first end cap for the arrangement;
   an outlet valve for directing the mobile phase with the sample of analyte from a selected one of the chromatography columns to an output, the outlet valve interfaces with the insulating sleeve and integrated into the second end cap for the arrangement;
   a controller configured for controlling the inlet valve and the outlet valve to serially pass the mobile phase with the sample of analyte through multiple successive ones of the plurality of a sequence of successive ones of the chromatography columns.

2. The chromatography columns arrangement of claim 1, further comprising an inlet mobile phase heater for each of the chromatography columns in the configuration.

3. The chromatography columns arrangement of claim 1, further comprising an outlet heater for each of the chromatography columns in the configuration.

4. The chromatography columns arrangement of claim 1, wherein the inlet valve has an inlet port connected to an inlet tube for receiving the mobile phase with the sample of analyte and respective ports in fluid communication with a respective one of the chromatography columns.

5. The chromatography columns arrangement of claim 1, wherein the outlet valve has an outlet port connected to an outlet tube for receiving the mobile phase with the sample of analyte and respective ports in fluid communication with a respective one of the chromatography columns.

6. The chromatography columns arrangement of claim 1, further comprising a single inlet mobile phase heater for the arrangement.

7. The chromatography columns arrangement of claim 1, further comprising fluidic connections from the outlet selection valve to inlets of at least some of the chromatography columns.

8. The chromatography columns arrangement of claim 1, wherein a first of the chromatography columns in the plurality of chromatography columns is oriented to have an inlet fluidically coupled to the inlet selection valve and an outlet fluidically coupled to the outlet selection valve and a second of the chromatography columns in the plurality of chromatography columns is oriented to have an inlet fluidically coupled to the outlet selection valve and an outlet fluidically coupled to an inlet selection valve.

9. The chromatography columns arrangement of claim 1, wherein the plurality of chromatography columns are liquid chromatography columns.

10. The chromatography columns arrangement of claim 1, wherein the single insulating sleeves is a vacuum sleeve, a sleeve of insulating material or a sleeve containing gas.

11. The chromatography columns arrangement of claim 1, wherein a first of the plurality of the chromatography columns has an inlet fluidically coupled to the inlet valve and a second of the plurality of the chromatography columns has an inlet fluidically coupled to the outlet valve.

12. The chromatography columns arrangement of claim 1, wherein the controller is configurable to select a desired number of chromatography columns for the mobile phase with the sample of analyte to serially pass though.

13. The chromatography columns arrangement of claim 12, wherein the desired number of chromatography columns is 2, 3, 4 or 5.

* * * * *